No. 12,805. REISSUED JUNE 2, 1908.

J. McINTYRE.

RUHMKORFF COIL.

APPLICATION FILED FEB. 21, 1908.

WITNESSES

William P. Goebel.

Ned G. Hoskins

INVENTOR

John McIntyre

BY Munn & Co

ATTORNEYS

UNITED STATES PATENT OFFICE.

JOHN McINTYRE, OF JERSEY CITY, NEW JERSEY.

RUHMKORFF COIL.

No. 12,805. Specification of Reissued Letters Patent. Reissued June 2, 1908.

Original No. 796,851, dated August 8, 1905, Serial No. 236,024. Application for reissue filed February 21, 1908. Serial No. 417,208.

*To all whom it may concern:*

Be it known that I, JOHN McINTYRE, a citizen of the United States, and a resident of Jersey City, in the county of Hudson and State of New Jersey, have invented a new and Improved Ruhmkorff Coil, of which the following is a full, clear, and exact description.

The invention relates to Ruhmkorff coils for use in electro-magnetic apparatus, such for instance as shown and described in the Letters Patent of the United States, No. 781,448, granted to me on January 31, 1905.

The object of the invention is to provide a new and improved Ruhmkorff coil, arranged to allow continuous running of the apparatus without requiring re-truing of the contact platinum-portions, and insuring a proper readjustment and contact between the said contact platinum-portions, without danger of quickly burning their registering faces.

The invention consists of novel features and parts and combinations of the same, which will be more fully described hereinafter and then pointed out in the claims.

A practical embodiment of the invention is represented in the accompanying drawings forming a part of this specification, in which similar characters of reference indicate corresponding parts in all the views.

Figure 1:
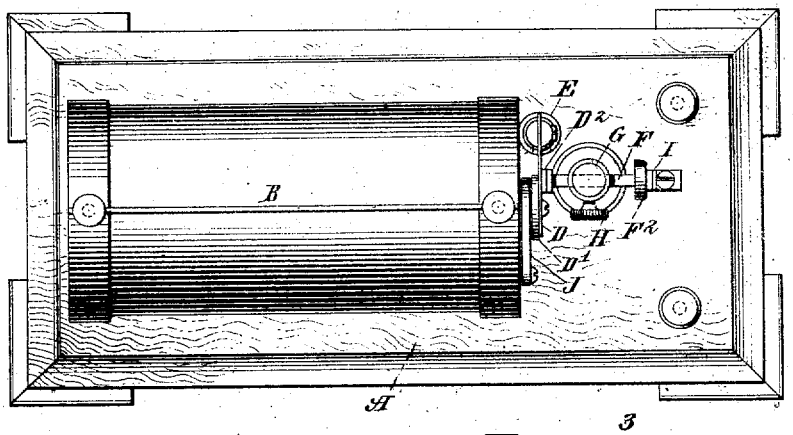
Figure 2:
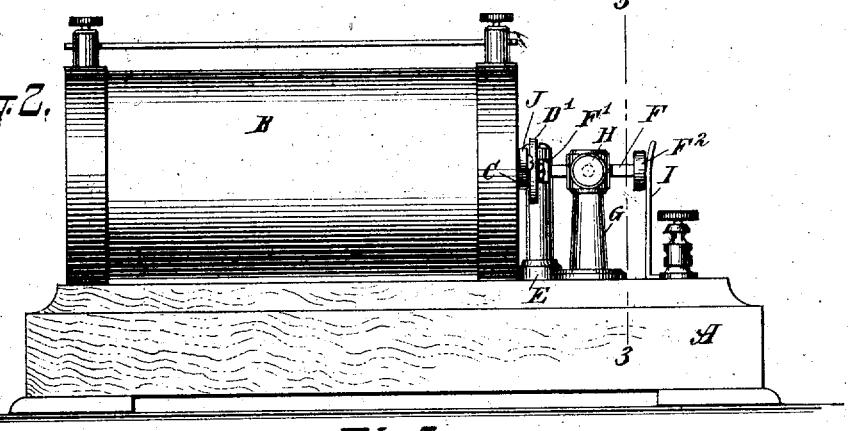
Figure 4:
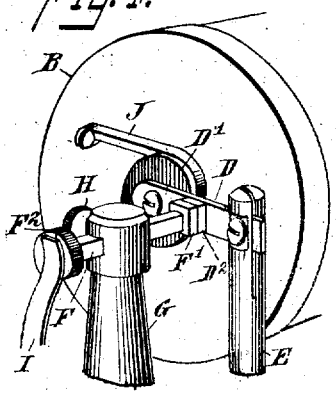
Figure 3:
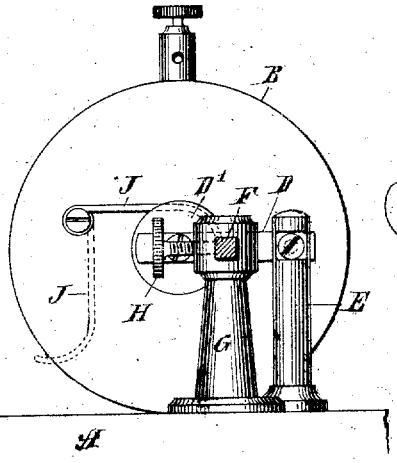
Figure 5:
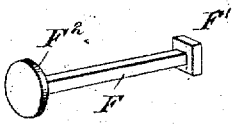

Figure 1 is a plan view of the improvement; Fig. 2 is a side elevation of the same; Fig. 3 is an enlarged cross section of the same, on the line 3—3 of Fig. 2; Fig. 4 is a perspective view of the improvement; and Fig. 5 is a perspective view of the non-rotatable, slidable bar carrying one of the contact-plates.

On the base A of the apparatus is mounted the usual coil-cylinder B carrying the primary and secondary wires and the central core C, opposite the outer end of which is arranged the armature D′ on the free end of a spring armature-lever D, fixed at its other end in a suitable post E carried by the base A. On the spring armature-lever D, between the armature D′ and the fixed end, is held a contact platinum-portion $D^2$, as indicated in the drawings. The contact platinum-portion $D^2$ is opposite a similar contact platinum-portion F′ fixed on one end of a bar F of square or other polygonal cross section, or at least so constructed that it cannot rotate, and fitted to slide in a correspondingly shaped bearing held on a post G attached to the base A. A set-screw H, screwing in the post G against the bar F, serves to lock the latter in place after the desired adjustment is made. To bring the contact-platinum portion F′ in proper relation to the armature-lever contact-platinum portion $D^2$, a spring I, secured at one end to the base A, presses with its free end against the knob $F^2$ on the outer end of the bar F, so that when the screw H is loosened the spring I causes the bar F to slide toward the armature-lever D, to bring the contact portion F′ in proper relation to the contact-portion $D^2$. By the arrangement described the bar F carrying the contact portions F′ is spring-pressed, to bring the contact portions $D^2$ and F′ into proper face contact with each other. When this has been done the bar F is fastened in place.

In order to hold the armature-lever D temporarily in a fixed position while adjusting the bar F, a retaining device J is employed, such as an arm or bar, fulcrumed on the face of the coil-cylinder B and adapted to be swung in position between the face of the cylinder B and the inner face of the armature D′ of the armature-lever D, so as to prevent the said armature D′ from swinging toward the core C, and while the armature D′ and consequently the armature-lever D are held by the said retaining device J against a swinging motion in the direction described, the bar F is adjusted as above described, to bring the contact portion F′ in proper relation to the contact-portion $D^2$.

It is understood that by the use of the retaining means, the armature is held temporarily against movement, to allow minute adjustment of the operating mechanism of the induction coil to suit existing conditions.

After the bar F has been adjusted and secured in place, the operator swings the retaining device J back into a normal inactive position, as indicated in dotted lines in Fig. 3, that is, out of engagement with the armature D′, to allow the armature-lever to vibrate in the usual manner when the apparatus is in use.

It is understood that the apparatus is provided with the usual binding-posts and wire-connections common to Ruhmkorff or other induction coils, and further description of the same is not deemed necessary.

By the arrangement described the faces of the contact-portions $D^2$ and $F'$ while the apparatus is in use always contact in a straight-line direction to each other, that is, the face of the contact-portion $F'$ interlocks with but is not rubbed against the contact-portion $D^2$ when an adjustment is to be made.

In Ruhmkorff coils as heretofore constructed, the contact platinum portion $F'$ was usually on the end of a screw screwing in a post, and hence the contact-portion was rotated while moving toward and from the other contact-portion on the armature-lever. During this rotation the minute projections on the faces of the contact-portions $F'$ and $D^2$, caused by the spark of the previous operation of the apparatus, override or rub each other and are broken off, and consequently the two faces of the contact-portions are injured and no longer true, and cause a bad contact and excessively destructive sparking, thus requiring a frequent truing of the contact-faces and re-adjustment of the screw to keep the apparatus running for any length of time. With the arrangement described, the opposite faces of the contact-portions $D^2$, $F'$ contact in a straight-line direction, interlock and are in minute register with each other and without danger of injuring the faces when making the re-adjustment, and as the operator might not possess the mechanical ability to re-true the platinum faces, the benefit of the improvement may be more evident, and thus the apparatus can run as long and as well as in the first operation. It is expressly understood that the projections on the faces of the contact-portions $D^2$, $F'$ do not rub against each other or are not ground off, and hence the danger of injury to the faces of the contact-portions $D^2$, $F'$ is eliminated. By the arrangement described, the usual compulsory re-truing of the contacting faces and consequent waste of these expensive platinum portions is entirely avoided and the whole operation is simplified.

It is understood that in electro-magnetic apparatus such as referred to, in which a Ruhmkorff coil is an important element, it is desirable to uninterruptedly have the Ruhmkorff coil in action with the least necessity for re-adjustment, so as to produce the best results on the object under treatment.

Having thus described my invention, I claim as new and desire to secure by Letters Patent:

1. A Ruhmkorff coil provided with a spring-armature-lever carrying a contact portion, a bar arranged at an angle to the said armature-lever and carrying a contact portion for engagement by the said armature contact portion, and a bearing for the said bar to slide in and for holding the bar against turning, to maintain the faces of the said contact portions at all times in the same straight-line registering position.

2. A Ruhmkorff coil provided with a spring armature-lever carrying a contact portion, a bar arranged at an angle to the said armature-lever and carrying a contact portion for engagement by the said armature contact portion, a bearing for the said bar to slide in and for holding the bar against turning to maintain the faces of the said contact portions at all times in the same straight-line registering position, and a fastening device for securing the bar in place in the said bearing after the desired adjustment is made.

3. A Ruhmkorff coil provided with a spring armature lever carrying a contact portion, a bar carrying a contact portion for engagement by the said armature contact portion, a bearing for the said bar to slide in and for holding the bar against turning, and a spring pressing against the bar at the end opposite the one carrying the contact-portion.

4. A Ruhmkorff coil comprising a coil-cylinder carrying the primary and secondary wires and the core, a spring armature-lever fixed at one end and carrying at its free end an armature located opposite the said core, a contact portion on the said armature-lever, intermediate the fixed end and the said armature, a bar slidable at an angle toward and from the said armature-lever and carrying a contact portion opposite the said armature-lever contact portion, and means for the bar to slide in and to hold it against rotation, to maintain the faces of the said contact portions at all times in the same straight-line registering position.

5. A Ruhmkorff coil comprising a coil-cylinder carrying the primary and secondary wires and the core, a spring armature-lever fixed at one end and carrying at its free end an armature located opposite the said core, a contact portion on the said armature-lever, intermediate the fixed end and the said armature, a bar slidable at an angle toward and from the said armature-lever and carrying a contact portion opposite the said armature-lever contact portion, means for the bar to slide in and to hold it against rotation to maintain the faces of the said contact portions at all times in the same straight-line registering position, and means for holding the said armature and armature-lever in position while adjusting the said bar in the direction of its length.

6. A Ruhmkorff coil comprising a coil-cylinder carrying the primary and secondary wires and the core, a spring armature-lever fixed at one end and carrying at its free end an armature located opposite the said core, a contact portion on the said armature-lever, intermediate the fixed end and the said armature, a slidable bar carrying a contact portion opposite the said armature-lever contact portion, means for the bar to slide in and to hold it against rotation, a spring pressing the said bar in the direction of its length, and retaining means engaging the said armature and armature-lever for holding the armature-lever in position while adjusting the bar.

7. A Ruhmkorff coil comprising a coil-cylinder carrying the primary and secondary wires and the core, a spring armature-lever fixed at one end and carrying at its free end an armature located opposite the said core, a contact portion on the said armature-lever, intermediate the fixed end and the said armature, a slidable bar carrying a contact portion opposite the said armature-lever contact portion, means for the bar to slide in and to hold it against rotation, a spring pressing the said bar in the direction of its length, and retaining means engaging the said armature and armature-lever, for holding the armature-lever in position while adjusting the bar, the said retaining means consisting of a bar fulcrumed on the end of the coil-cylinder and adapted to be swung into position between the said cylinder and the inner face of the armature and armature-lever.

8. A Ruhmkorff coil having an armature-lever contact portion and a contact portion opposite the said armature-lever contact portion, and non-rotatable, to maintain the faces of the said contact portions at all times in the same straight-line registering position, the said non-rotatable contact portion being adapted to be moved at a right angle toward and from the said armature-lever contact portion.

9. An induction coil provided with a spring armature lever carrying a contact portion, and a bar arranged at an angle to the said armature lever and carrying a contact portion having an interlocking face contact and a non-turning and a non-rubbing contact with the said armature contact portion.

10. An induction coil provided with a spring armature lever carrying a contact portion, and a spring-pressed bar arranged at an angle to the said armature lever and carrying a contact portion having an interlocking face contact, and a non-turning and a non-rubbing contact with the said armature contact portion.

11. An induction coil provided with a retaining device independent of the vibrator and adapted to engage and hold the same temporarily while adjusting the operating mechanism of the induction coil.

12. An induction coil provided with a coil cylinder carrying the primary and secondary wires and the core, a vibrator operating in conjunction with the said core, an adjustable contact for the said vibrator, and a retaining device normally out of engagement with the said vibrator and adapted to engage and hold the same against movement relative to the core and while adjusting the said adjustable contact.

In testimony whereof I have signed my name to this specification in the presence of two subscribing witnesses.

JOHN McINTYRE.

Witnesses:

THEO. G. HOSTER,
JOHN P. DAVIS.